March 9, 1937.   T. C. STEIMER   2,073,573
GLASS FEEDING MECHANISM
Original Filed Feb. 12, 1910
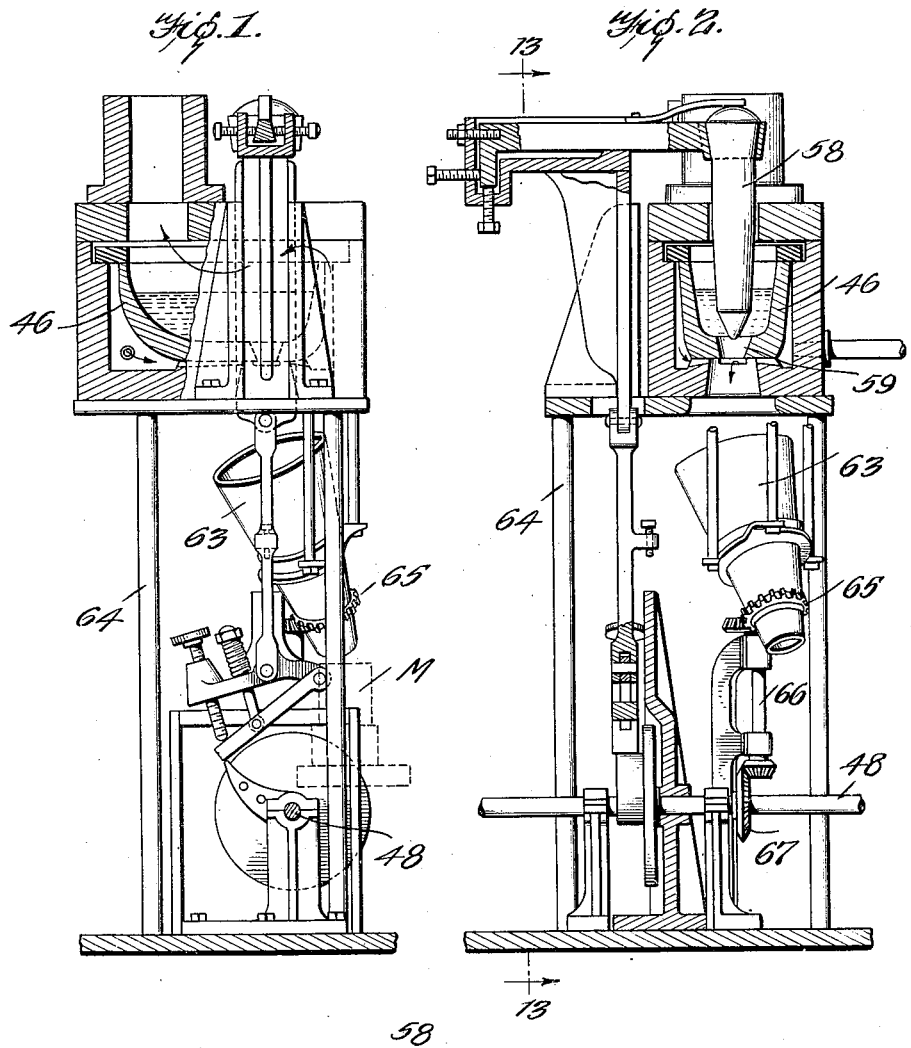
Inventor
Theodore C. Steimer, Deceased
Charles M. Steimer, Executor
Attorney Patented Mar. 9, 1937

2,073,573

UNITED STATES PATENT OFFICE 2,073,573

GLASS FEEDING MECHANISM

Theodore C. Steimer, deceased, late of Pittsburgh, Pa., by Charles M. Steimer, executor, Zanesville, Ohio, assignor, by mesne assignments, to Hartford-Empire Company, Hartford, Conn., a corporation of Delaware Original application February 12, 1910, Serial No. 543,582. Divided and this application October 27, 1925, Serial No. 65,185. In Canada January 26, 1918

3 Claims. (Cl. 49—5)

This application is a division of application No. 543,582, filed in the United States Patent Office Feb. 12, 1910.

The invention herein claimed relates to the art of feeding glass for the manufacture of pressed or blown articles, such as table-ware and the like.

The primary objects of this mechanism are to provide means to receive mold charges of glass supplied by a suitable feeder and to deliver the same to forming mechanism, and for this purpose it involves the use of an inclined chute adapted to receive the glass from the feeder and to convey the same to over a suitable receptacle, the chute at the point at which it receives the glass falling from the feeder being inclined at such an angle to the line of fall of the glass as to prevent deformation of the charge by impact on the chute. Specifically, the chute is, by preference, rotated around an axis.

Referring to the accompanying drawing in which corresponding parts are designated by corresponding marks of reference,—

Figure 1 is a partial side elevation and partial section of a mechanism embodying the matter herein claimed as the invention of T. C. Steimer, the section being taken partly on line 13 of Figure 2.

Figure 2 is a section on the line 14 of Figure 1, and elevation of a different view of the same mechanism.

Figure 3 is a fragmental view partly in elevation and partly in section, showing the delivery of a charge of glass.

46 is a reservoir containing molten glass and provided with a submerged discharge outlet 59 in its bottom with which cooperates a reciprocating plunger 58 to control the issuance of glass from the said reservoir, the feeder being so constructed and operated as to cause glass issuing from the outlet to accumulate in a mold charge suspended from the outlet which, when accumulated, is separated from the outlet and allowed to freely fall therefrom, as illustrated in Figure 3.

A suitable mold mechanism, shown at M in dotted lines in Figure 1, is located below and to one side of the vertical passing through the discharge outlet 59.

A conical chute 63 is mounted in a frame 64 so as to revolve freely around an inclined axis, it carrying a gear 65 which is driven through shaft 66 by gear 67 on shaft 48 driven in any suitable manner. This cone has its open upper end located vertically beneath the outlet 59 and has a lower open end located over a position occupied by the mold M.

In operation, the cone is revolved by the mechanism before described, and charges of glass dropping thereon will slide and roll down the inclined wall of the chute and be delivered to the mold. The rotation thereby induced reduces irregular cooling to a minimum.

It will be noted that the lower surface of the cone is inclined at an acute angle to the vertical. This angle causes charges of glass falling on the lower surface of the cone near its upper edge to be deflected in an inclined path and prevents extreme deformation of the charge which would result from impact with a surface at an obtuse angle to its line of fall. The charge so received slides down the chute, and rolls thereon in the rotation of the chute, until its delivery to the mold M.

As stated, this application is filed as a division of the aforesaid original, to cover the means for receiving glass from a feeder and delivering it to receptacles located away from below the feeder outlet. While to properly explain the manner of using such a device certain other features have been illustrated and referred to, such other features form no part of the invention here claimed, they forming the subject matter of claims made in the said original application, or of other applications filed as divisions thereof.

The invention of Theodore C. Steimer having been described, what is claimed and desired to be secured by Letters Patent is:—

1. The combination with means to feed charges of glass and a pressing machine fed thereby, of a revolving cone adapted to receive charges of glass and deliver them to the molds of the pressing machine.

2. The combination with means to feed charges of glass and a forming machine fed thereby, of an inclined revolving tubular chute adapted to receive charges of glass and deliver them to the forming machine.

3. The combination with a feeder having a submerged delivery orifice delivering freely falling charges of glass, of a receptacle located to one side of the vertical passing through the orifice and an inclined chute located below the orifice a distance greater than the length of the charge to receive charges falling from the orifice and to convey the same to the receptacle, the chute at the point it receives the charge being sharply inclined to the line of fall of said charge to prevent deformation of the latter.

CHARLES M. STEIMER.
Executor of Estate of Theodore C. Steimer,
Deceased.